United States Patent
Hong et al.

(10) Patent No.: US 7,802,298 B1
(45) Date of Patent: Sep. 21, 2010

(54) METHODS AND APPARATUS FOR PROTECTING COMPUTERS AGAINST PHISHING ATTACKS

(75) Inventors: Paul Hong, Nanjing (CN); Xiaoming Zhao, Nanjing (CN); Gang Chen, Nanjing (CN)

(73) Assignee: Trend Micro Incorporated, Tokyo (JP)

( * ) Notice: Subject to any disclaimer, the term of this patent is extended or adjusted under 35 U.S.C. 154(b) by 1071 days.

(21) Appl. No.: 11/502,050

(22) Filed: Aug. 10, 2006

(51) Int. Cl.
*G08B 23/00* (2006.01)
*G06F 12/14* (2006.01)

(52) U.S. Cl. .............. 726/22; 705/51; 705/52; 705/53; 705/54; 713/189; 713/190; 713/191; 713/192; 713/193; 713/194

(58) Field of Classification Search ............. 726/22
See application file for complete search history.

(56) References Cited

U.S. PATENT DOCUMENTS

| | | | |
|---|---|---|---|
| 7,021,534 B1 | 4/2006 | Kiliccote | |
| 2005/0160330 A1* | 7/2005 | Embree et al. | 714/57 |
| 2006/0064374 A1 | 3/2006 | Helsper et al. | |
| 2006/0070126 A1* | 3/2006 | Grynberg | 726/22 |
| 2006/0101120 A1 | 5/2006 | Helsper et al. | |
| 2006/0123464 A1* | 6/2006 | Goodman et al. | 726/2 |
| 2006/0123478 A1 | 6/2006 | Rehfuss et al. | |
| 2006/0168066 A1 | 7/2006 | Helsper et al. | |
| 2007/0112814 A1* | 5/2007 | Cheshire | 707/101 |
| 2007/0282739 A1* | 12/2007 | Thomsen | 705/39 |
| 2008/0028444 A1* | 1/2008 | Loesch et al. | 726/4 |
| 2008/0082662 A1* | 4/2008 | Dandliker et al. | 709/225 |

* cited by examiner

*Primary Examiner*—Taghi T Arani
*Assistant Examiner*—Mahfuzur Rahman
(74) *Attorney, Agent, or Firm*—Okamoto & Benedicto LLP (57) ABSTRACT

In one embodiment, a client computer is protected from phishing attacks using a sensitive state monitor and a phishing site detector. The sensitive state monitor may detect reception of a web page displayed in a web browser of the client computer. The sensitive state monitor may determine whether or not the web page is a sensitive web page, such as those used to receive user confidential information. When the sensitive state monitor determines that the web page is sensitive, the sensitive state monitor may ask the user to confirm that the web page is indeed sensitive. After user confirmation, the sensitive state monitor may invoke the phishing site detector, which may determine whether or not the website serving the web page is a phishing site.

7 Claims, 5 Drawing Sheets

METHODS AND APPARATUS FOR PROTECTING COMPUTERS AGAINST PHISHING ATTACKS

BACKGROUND OF THE INVENTION

1. Field of the Invention

The present invention relates generally to data processing, and more particularly but not exclusively to anti-phishing techniques.

2. Description of the Background Art

Various financial transactions may be performed over the Internet. Examples of these financial transactions include online banking, sending or receiving of payments for product purchases (e.g., use of PayPal™ system), credit card purchases, and so on. Unfortunately, the convenience of performing online financial transactions over the Internet not only attracts legitimate users but fraudsters as well.

Fraudsters gain access to online financial accounts of their victims using a variety of techniques including by "phishing." Phishing is a kind of social engineering that involves some form of misrepresentation. In a typical phishing attack, the victim receives an email falsely claiming to be from the victim's financial institution. The email is made to look convincingly real, oftentimes complete with the look and feel of emails, from the financial institution. The email includes a link to the fraudster's website, also referred to as "phishing site," that serves a web page where the victim enters confidential financial account information (e.g., login ID and password) thinking he is providing the information to his financial institution. The web page from the phishing site, like the email linking to it, is made to look authentic.

Anti-phishing techniques have been developed to combat phishing attacks. One way of combating phishing is to create and maintain a database of known phishing sites. The database serves as a blacklist that may be consulted to alert users if they visit a potentially dangerous website. While effective for the most part, this solution can only detect some known phishing attacks because phishing sites, like other web servers on the Internet, can be relocated rather easily. Furthermore, it may be difficult to keep up with the increasing number of phishing sites.

Web browsers may be equipped with tools that clearly display the characteristics of a website being accessed, such as domain name, security lock state etc. While these tools can help users evaluate a website, the tools themselves generally cannot identify a phishing site.

Phishing may be identified by looking for phishing characteristics. For example, an anti-phishing technique may check some attributes of a website being accessed, such as uniform resource locator (URL), hosting location, owner, page content, browser security lock state etc. Unfortunately, because some legitimate websites share characteristics with fraudulent websites, relying on phishing characteristics may result in a large number of false positives (i.e., erroneous identification of a legitimate site as fraudulent). Furthermore, sophisticated phishing attacks specifically minimize known phishing characteristics.

Sensitive transactions may employ additional authentication mechanisms as a precautionary measure against phishing. Examples of such additional authentication mechanisms include hardware tokens that provide challenge/response authentication, smart cards with the public key cryptography, use of text messaging as an additional authentication channel, and so on. While effective for the most part, these techniques have relatively high implementation and maintenance costs and are cumbersome to the user.

SUMMARY

In one embodiment, a client computer is protected from phishing attacks using a sensitive state monitor and a phishing site detector. The sensitive state monitor may detect reception of a web page displayed in a web browser of the client computer. The sensitive state monitor may determine whether or not the web page is a sensitive web page, such as those used to receive user confidential information. When the sensitive state monitor determines that the web page is sensitive, the sensitive state monitor may ask the user to confirm that the web page is indeed sensitive. After user confirmation, the sensitive state monitor may invoke the phishing site detector, which may determine whether or not the website serving the web page is a phishing site.

These and other features of the present invention will be readily apparent to persons of ordinary skill in the art upon reading the entirety of this disclosure, which includes the accompanying drawings and claims.

DESCRIPTION OF THE DRAWINGS

The use of the same reference label in different drawings indicates the same or like components.

DETAILED DESCRIPTION

In the present disclosure, numerous specific details are provided, such as examples of apparatus, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Embodiments of the present invention are described in the context of online financial transactions for illustration purposes only. In light of the present disclosure, those of ordinary skill in the art will appreciate that embodiments of the present invention may be generally employed in computer security and screening applications. For example, embodiments of the present invention may also be employed in e-commerce applications.

Figure 1:
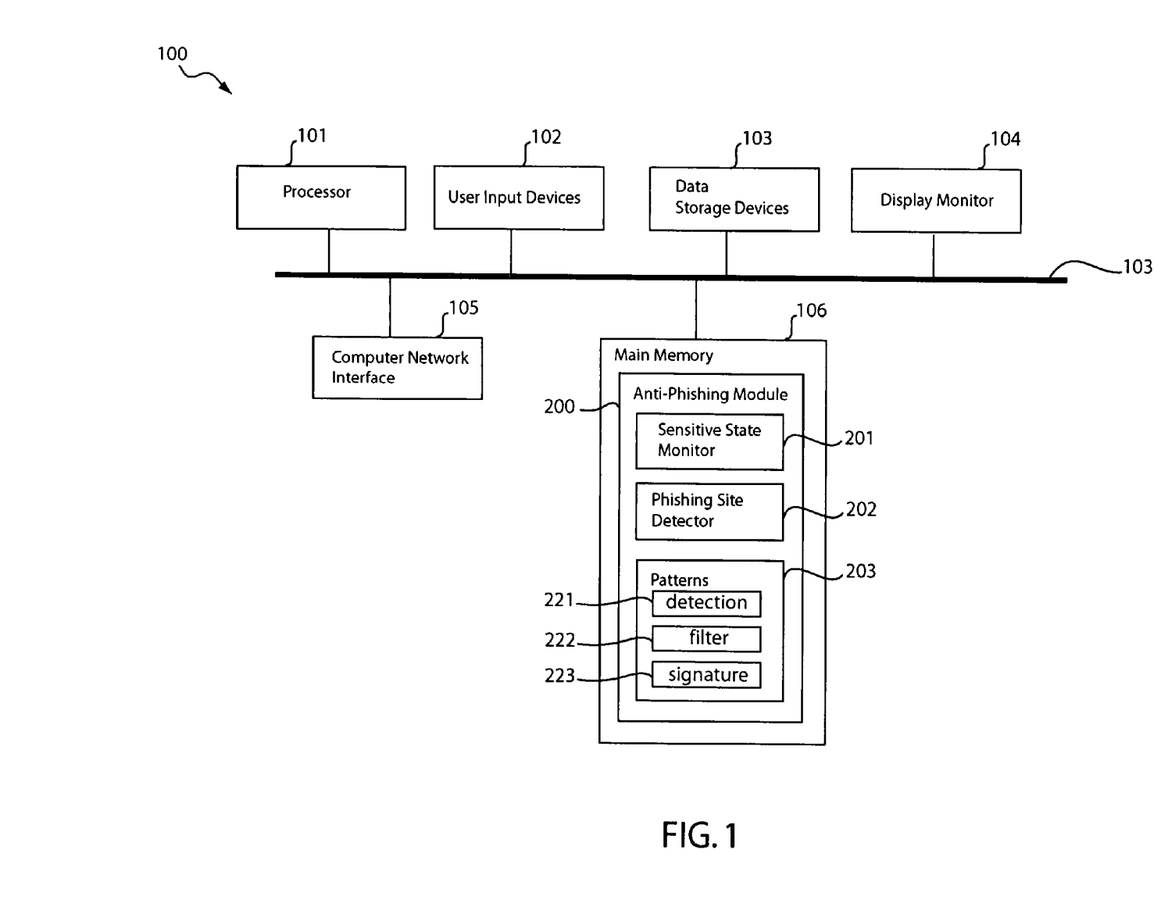
FIG. 1 shows a schematic diagram of a client computer that may be used in embodiments of the present invention.

Referring now to FIG. 1, there is shown a schematic diagram of a client computer 100 that may be used in embodiments of the present invention. In the example of FIG. 1, the computer 100 may have less or more components to meet the needs of a particular application. The computer 100 may include a processor 101, such as those from the Intel Corporation or Advanced Micro Devices, for example. The computer 100 may have one or more buses 103 coupling its various components. The computer 100 may include one or more user input devices 102 (e.g., keyboard, mouse), one or more data storage devices 103 (e.g., hard drive, optical disk, USB memory), a display monitor 104 (e.g., LCD, flat panel monitor, CRT), a computer network interface 105 (e.g., network adapter, modem), and a main memory 106 (e.g., RAM). In the example of FIG. 1, the main memory 106 includes software components of an anti-phishing module 200. The anti-phishing module 200 may be executed by the processor 101. As can be appreciated, the anti-phishing module 200 may also be implemented in hardware or combination of hardware and software (e.g., firmware) in other embodiments.

The anti-phishing module 200 may comprise a sensitive state monitor (SSM) 201, a phishing site detector 202, and patterns 203. The patterns 203 may comprise several patterns including detection patterns 221 for identifying sensitive documents, filter patterns 222 for making corrections in evaluating documents, and signature patterns 223 for distinguishing legitimate sensitive sites from phishing sites. The detection patterns 221, the filter patterns 222, and the signature patterns 223 are collectively shown in FIG. 1 as the patterns 203 for ease of illustration. In practice, these patterns are preferably stored and maintained separately, with the detection patterns 221 and the signature patterns 223 periodically updated by a remote support server (e.g., see support server 212 of FIG. 4).

The sensitive state monitor 201 may comprise computer-readable program code for determining whether a document, such as a web page, is sensitive. A sensitive document is one that is configured to receive user confidential information. Examples of sensitive documents include web pages used for accessing online financial accounts, such as login pages for online banking or money transfer. In one embodiment, the sensitive state monitor 201 is configured to detect reception of a web page in the client computer 100, determine whether or not the web page is a sensitive web page, and invoke the phishing site detector if the web page is a sensitive web page. As will be more apparent below, to minimize false positives, the sensitive monitor 201 may be configured to confirm with the user whether or not a detected sensitive web page is actually so. Upon detection of a sensitive web page, the sensitive state monitor 201 is configured to invoke the phishing site detector to determine in real-time whether or not the sensitive web page is from the website it purports to be.

Figure 2:
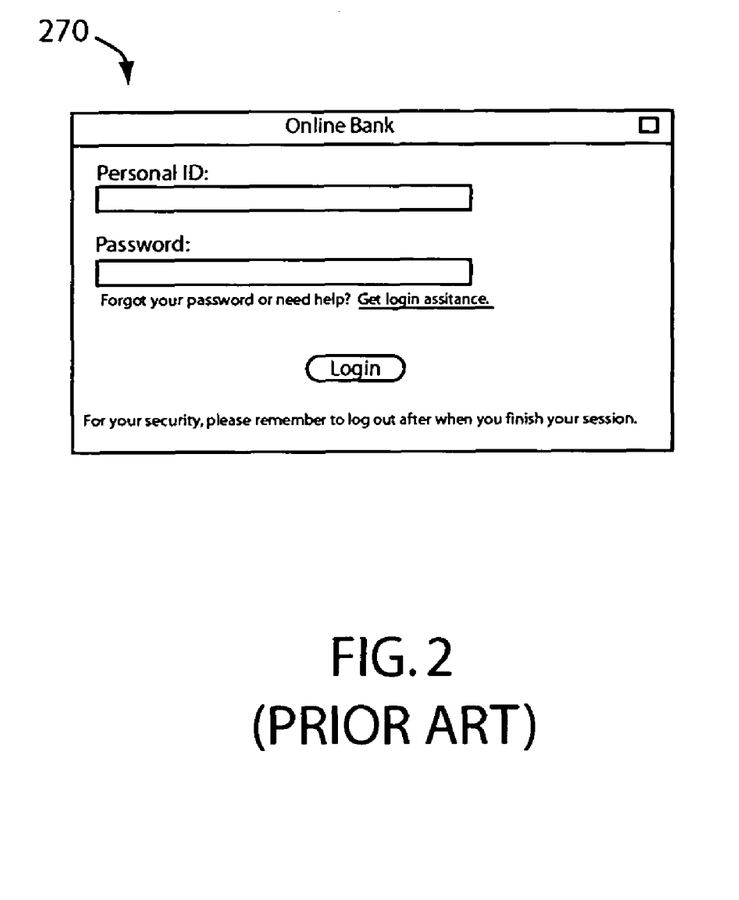
FIG. 2 shows an example sensitive web page of an online bank.

The sensitive state monitor 201 filters normal (i.e., non-sensitive) web pages from sensitive ones. In one embodiment, the sensitive state monitor 201 evaluates a web page by looking for characteristics that distinguish sensitive from normal web pages. For example, online bank login pages usually contain some distinguishing characteristics, such as unique title bars, keywords and characters present in the particular online bank's login page, particular input boxes, and so on. These characteristics may vary from bank to bank but are usually easily observed by a software engineer, who can then enter the characteristics in a database or look-up table. In one embodiment, these characteristics are stored as detection patterns 221. FIG. 2 shows an example sensitive web page 210 of a fictitious online bank referred to as "Online Bank." As shown in FIG. 2, the web page 210 may include a unique title bar ("Online Bank" in the example), keywords and characters ("Forgot your password or need help? . . . ", "For your security, please remember . . . "), and input boxes for entering a password and user ID.

The sensitive state monitor 201 may employ content identification technology to scan a web page's content for keywords and related patterns indicative of a sensitive web page. The sensitive state monitor 201 may also check a web page for input boxes and related patterns found in typical sensitive web pages. For example, the sensitive state monitor 201 may look for HTML tabs (e.g., <input type="password">) representing password input boxes. The sensitive state monitor 201 may also employ image identification technology to identify input boxes. For example, input boxes typically have rectangular shapes and characteristic color schemes, making them relatively easy to identify.

Keywords, input boxes, and related patterns indicative of sensitive web pages may be stored as detection patterns 221. The detection patterns 221 may be stored in a pattern file and then loaded onto the memory 106; the pattern file may be periodically updated from a remote support server computer. The sensitive state monitor 201 may consult the detection patterns 221 to evaluate a web page to determine whether a web page is sensitive or not. The sensitive state monitor 201 may score a web page based on the number of keywords, input boxes, and related patterns that it shares with typical sensitive web pages; the web page may be deemed as sensitive if its score goes beyond a predetermined threshold.

Figure 3A:
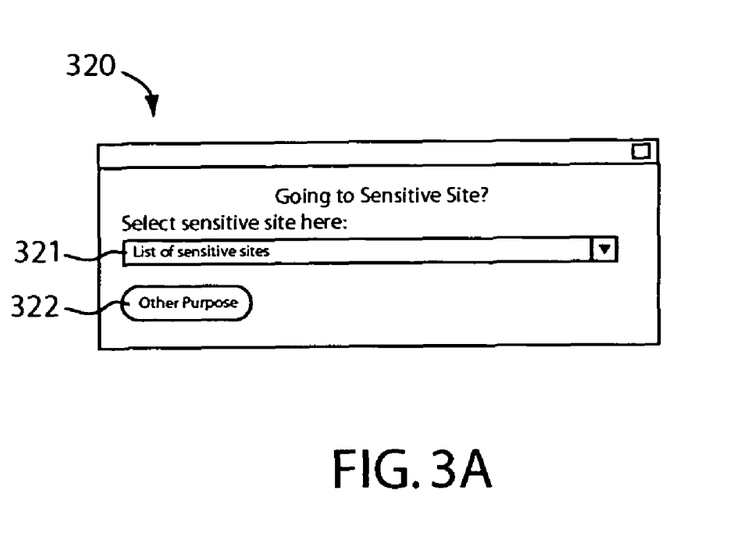
FIGS. 3A and 3B show an example message box in accordance with an embodiment of the present invention.

Once it identifies a web page as sensitive, the sensitive state monitor 201 may be configured to confirm with the user that the web page is indeed sensitive. For example, once it deems a web page sensitive, the sensitive state monitor 201 may prompt the user to select a destination sensitive site or indicate that he or she is not going to a sensitive site. FIG. 3A shows an example message box 320 displayed by the sensitive state monitor 201 to the user once it identifies a sensitive web page, in accordance with an embodiment of the present invention. In the example of FIG. 3A, the user may confirm that the web page detected by the sensitive state monitor 201 is indeed sensitive by selecting a sensitive website from a pull-down menu 321. Otherwise, if the web page is not sensitive (i.e., the sensitive state monitor 201 is wrong), the user can select "other purpose" by activating the button 322. In that case, the sensitive state monitor 201 takes note of the error in identifying the web page so that it may avoid this error in the future. In one embodiment, the sensitive state monitor 201 does so by storing the IP address of the website serving the erroneously identified web page in the filter patterns 222 (see FIG. 1). The sensitive state monitor 201 deems web pages being served by a website having an IP address listed in the filter patterns 222 as non-sensitive regardless of their characteristics. That is, upon detection of a web page in the client computer 100, the sensitive state monitor 201 first determines if the web page is from a website having an IP address listed in the filter patterns 222. If so, the sensitive state monitor 201 deems the web page as non-sensitive. Otherwise, the sensitive state monitor 201 evaluates the web page using the detection patterns 221 as previously described. This allows the sensitive state monitor 201 to correctly evaluate web pages it erroneously classified as sensitive the next time the user accesses the website.

Figure 3B:
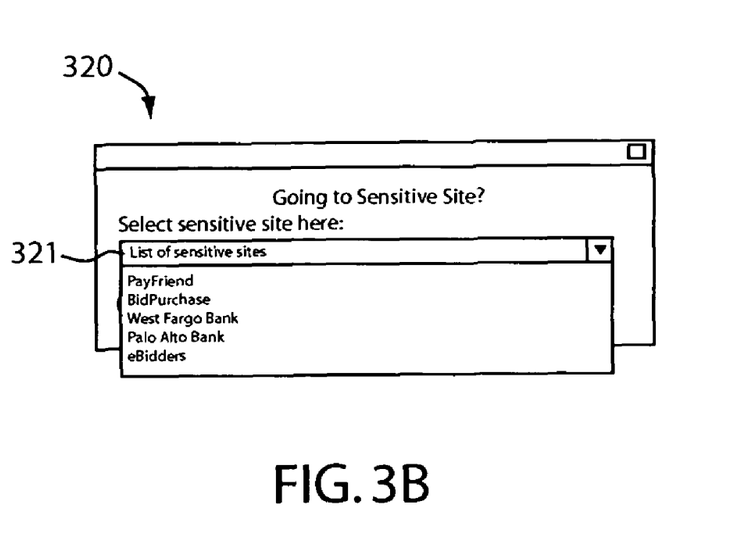

FIG. 3B shows the message box 320 when the user activates the pull-down menu 321. As shown in FIG. 3B, the user may select from a predetermined list of sensitive websites to confirm that the web page is indeed sensitive. In one embodiment, websites listed in the list of predetermined list of sensitive websites have corresponding signature entries in the signature patterns 223. As is well known, a website may be hosted in different web servers. Accordingly, each signature may comprise an IP address and a security certificate for each web server of the website.

The sensitive state monitor 201 may request a remote support server 212 (see FIG. 4) for identifying information (e.g., IP address, certificate, etc.) of all websites included in the pull-down menu 321. In response, the remote server 212 may provide the client computer 100 updated signature patterns 223 that include the identifying information.

As can be appreciated from the foregoing, the sensitive state monitor 201 serves as a pre-processor for the phishing site detector 202. Rather than trying to identify whether a web page is part of a phishing attack, the sensitive state monitor 201 instead identifies whether or not a web page is sensitive. That is, the sensitive state monitor does not have to identify phishing, so it can focus on the simpler task of identifying sensitive web pages (which may be phishing or not). Identifying whether a web page is phishing, as is conventionally done, invites false positives as phishing attacks become more complex and employ web pages that appear legitimate. By filtering sensitive from normal sites then asking the user to identify a particular sensitive website he or she is going to access, the sensitive state monitor 201 advantageously reduces the universe of types of websites the phishing detector 202 has to evaluate.

The phishing site detector (PSD) 202 may comprise computer-readable program code for determining whether or not a location on a computer network, such as a website on the Internet, is a phishing site. A phishing site typically comprises a web server employed by fraudsters to falsely mimic a legitimate sensitive site (e.g., an online bank website) to fraudulently receive user confidential information. In one embodiment, the phishing site detector 202 determines whether a web page is being served by a sensitive site selected by the user from the list of predetermined sensitive sites (see FIG. 3B). For example, the phishing site detector 202 may extract the IP address and security certificate of the currently accessed website and compare them to those stored in the signature patterns 223 for the sensitive site. If there is a match, then the phishing site detector 202 deems the currently accessed website to be legitimate. Otherwise, the phishing site detector 202 deems the currently accessed website to be a phishing site.

As can be appreciated, the signature patterns 223 may comprise a predefined signature database including identifying information of sensitive websites. Such identifying information, also referred to as "signatures," may include a website's IP address, certificate etc. A software developer may manually obtain identifying information of sensitive sites and store them as signature patterns 223. The phishing site detector 202 may compare the identifying information stored in the signature patterns 223 for a particular sensitive website (as selected by the user; see FIG. 3B) to that of a website serving a sensitive web page to determine whether or not the website is a phishing site. In essence, the phishing site detector 202 manages a white list of sensitive sites (those included in the list of predetermined sensitive sites; see FIG. 3B) and determines if a sensitive web page is from a user-selected sensitive site or from a phishing site mimicking the user-selected sensitive site.

Figure 4:
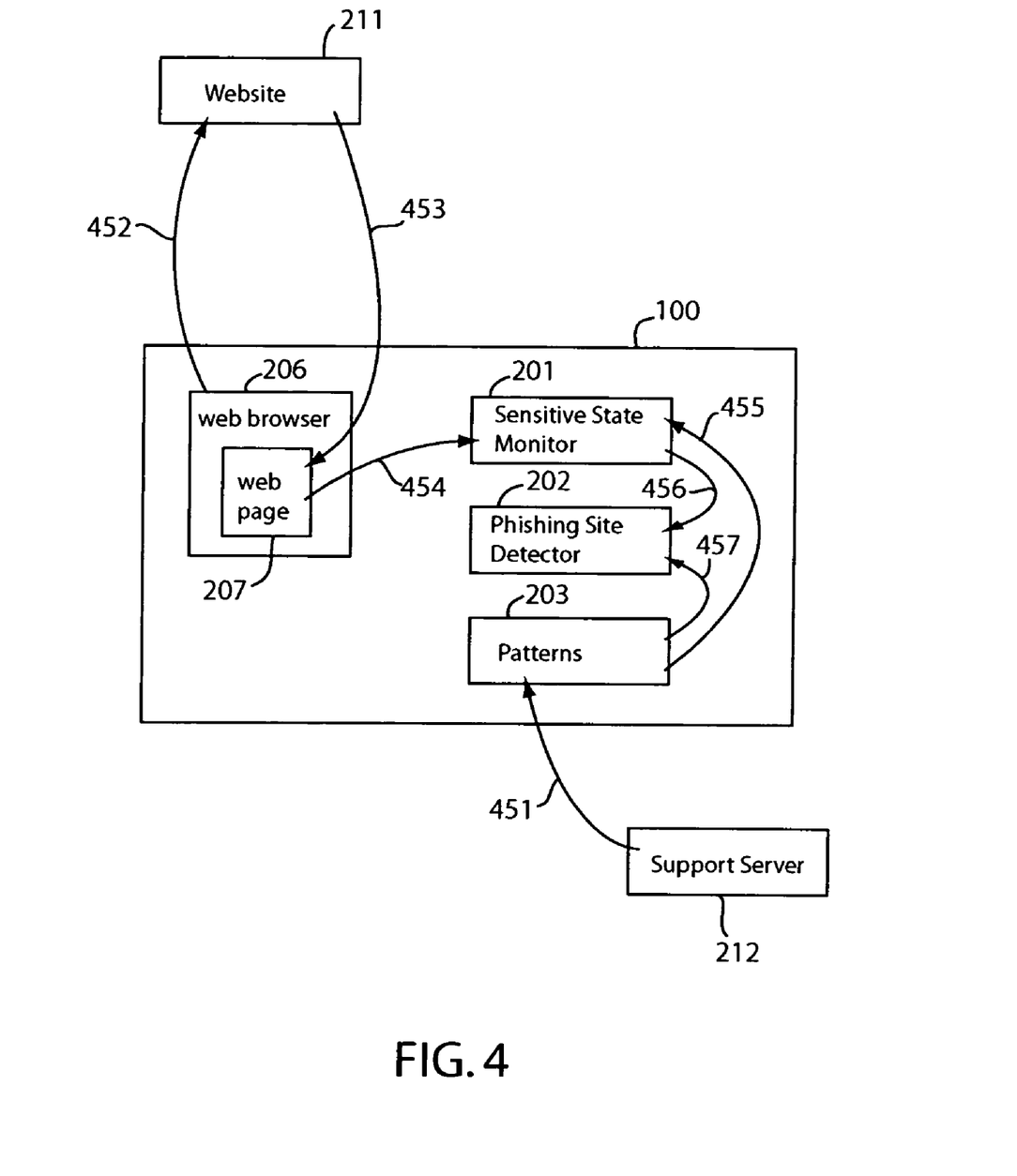
FIG. 4 shows a flow diagram schematically illustrating the operation of a client computer in accordance with an embodiment of the present invention.

FIG. 4 shows a flow diagram schematically illustrating the operation of a client computer 100, in accordance with an embodiment of the present invention. In the example of FIG. 4, the client computer 100 communicates with the website 211 and the support server 212 over the Internet. As such, arrows 451, 452, and 453 represent Internet connections. The website 211 may comprise a web server providing web pages to users on the Internet. The support server 212 may comprise a server computer configured to support the anti-phishing module 200, which in one embodiment comprises the sensitive state monitor 201, phishing site detector 202, and patterns 203 (see FIG. 1). The support server 212 may be operated by the vendor of the anti-phishing module 200. For example, the support server 212 may be operated by the TrendLabs™ antivirus research center of Trend Micro, Inc. The support server 212 may be configured to periodically provide updated detection patterns 2221 and signature patterns 223 (arrow 451) to the client computer 100 and other subscribing client computers.

Still referring to FIG. 4, a user on the client computer 100 may employ a web browser 206 to access a web page of the website 211 (arrow 452). In response, the website 211 serves a web page 207 to the client computer 100 (arrow 453). The web browser 206 displays the web page 207. The sensitive state monitor 201 detects reception of the web page 207 in the client computer 100 (arrow 454). For example, the sensitive state monitor 201 may utilize the plug-in interface of the web browser 206 to detect the web page 207. The sensitive state monitor 201 may determine whether or not the web page 207 is a sensitive web page by comparing the characteristics of the web page 207 to the detection patterns 221 of the patterns 203 (arrow 455). If the sensitive state monitor 201 deems the web page 207 as non-sensitive, the sensitive state monitor 201 does not do anything relating to the web page 207. Otherwise, if the sensitive state monitor 201 deems the web page 207 as sensitive, the sensitive state monitor 201 invokes the phishing site detector 202 (arrow 456). In that case, the phishing site detector 202 checks the identifying information of the website 211. For example, the phishing site detector 202 may obtain the certificate information of the website 211 by utilizing the plug-in interface of the web browser 206. The phishing site detector may obtain the IP address of the website 211 from connection-related data structures maintained in the client computer 100, for example. The phishing site detector 202 may also obtain identifying information of the website 211 using other suitable ways, depending on the operating system of the client computer 100, without detracting from the merits of the present invention.

The phishing site detector 202 may compare the identifying information of the website 211 to signature patterns 223 of the patterns 203 (arrow 457) to determine whether or not the website 211 is actually the sensitive site the user is trying to access, rather than a phishing site trying to appear as the sensitive site.

Figure 5:
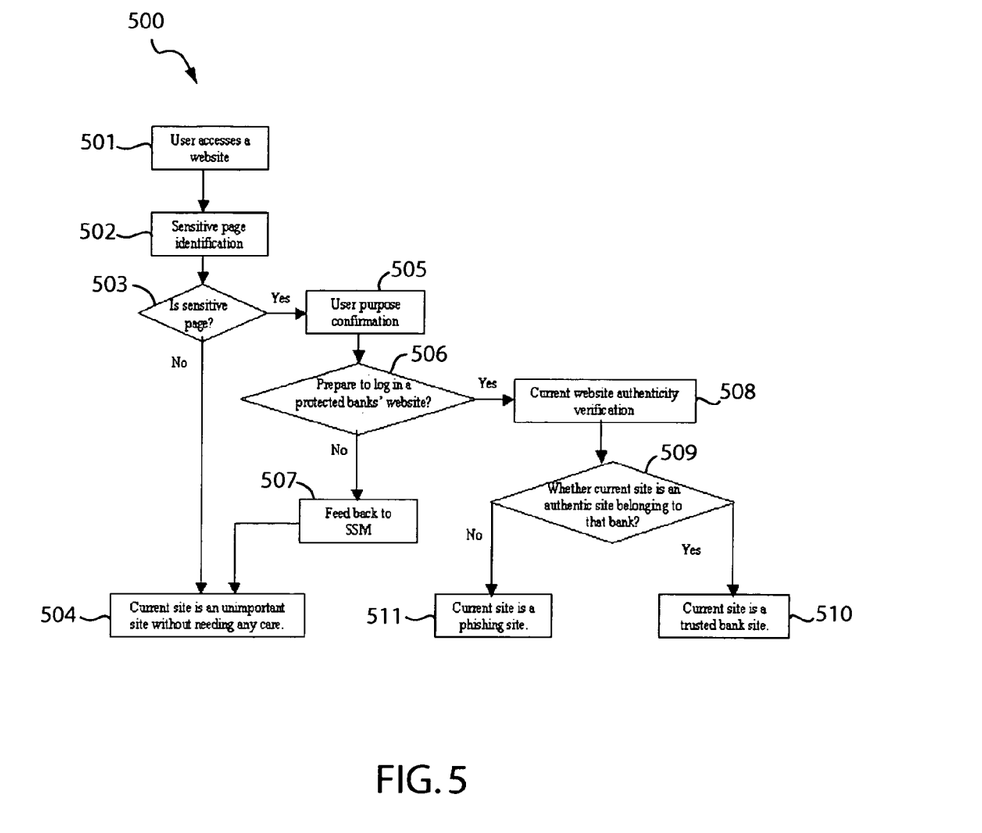
FIG. 5 shows a flow diagram of a method of protecting client computers against phishing attacks in accordance with an embodiment of the present invention.

FIG. 5 shows a flow diagram of a method 500 of protecting client computers against phishing attacks in accordance with an embodiment of the present invention. The method 500 is explained using the components of the previously described anti-phishing module 200 four illustration purposes only. Other components may also be used without detracting from the merits of the present invention. The method 500 shows an online banking example, but is equally applicable to other sensitive online transactions.

The method 500 begins when the user accesses a website to receive a web page (step 501). The sensitive state monitor 201 evaluates the web page to determine whether or not it is sensitive (step 502). In one embodiment, the sensitive state monitor 201 deems web pages being served by a website having an IP address listed in the filter patterns 222 (see FIG. 1) as non-sensitive regardless of the web pages' characteristics. If the web page is not from a website listed in the filter patterns 222, the sensitive state monitor 201 determines whether or not the web page is sensitive by comparing its characteristics to the detection patterns 221.

In one embodiment, the anti-phishing module 200 classifies websites as either sensitive or normal (i.e. non-sensitive). The anti-phishing module 200 further classifies sensitive websites as either legitimate or phishing. Within the group of legitimate sites, a website may be one of the predetermined sensitive sites that may be selected by the user during a confirmation process. The anti-phishing module 200 may thus determine the type of the currently accessed website by successive elimination. The step of determining whether a web page is sensitive is a first part of this elimination process that narrows down the type of the website serving the web page. If the sensitive state monitor 201 does not deem the web page to be sensitive (step 503 to step 504), the website cannot be a phishing site and anti-phishing module 200 does not have to do anything concerning the website.

If the sensitive state monitor 201 deems the web page to be sensitive (step 503 to step 505), the website may still be a legitimate site or a phishing site. In that case, the sensitive state monitor 201 asks the user to confirm that he is indeed trying to access a sensitive website (step 505). For example, the sensitive state monitor 201 may prompt the user to confirm or deny that he is trying to access a sensitive website. In one embodiment, the user may deny that he is trying to access a sensitive website by selecting a corresponding button (e.g., see button 322 of FIG. 3A). In that case, the sensitive state monitor 201 erroneously identified the web page as sensitive (step 506 to step 507). The sensitive state monitor 201 takes note of this error to correctly evaluate the web page next time the user accesses it (step 507). For example, the sensitive state monitor 201 may enter the IP address of the website in the filter patterns 222 (see FIG. 1). Because the web page is not sensitive, the anti-phishing module 200 does not do anything else concerning the website (step 507 to step 504).

In one embodiment, the user may confirm that he or she is trying to access a sensitive website by selecting a sensitive site from a list of predetermined sensitive sites (e.g., see pull-down menu 321 of FIG. 3B). If the user does so, this indicates that the user is indeed trying to access a sensitive website (step 506 to step 508). Furthermore, the anti-phishing module 200 now knows, in the elimination process, that the user is trying to access a particular sensitive site (i.e., the site the user selected from among the list of predetermined sensitive sites). Therefore, the anti-phishing module 200 now just have to determine whether the website serving the web page is the particular sensitive site the user is trying to access or a phishing site. Note that knowing the particular sensitive site the user is trying to access allows the phishing site detector 202 to focus on determining if the website is actually a particular sensitive site, rather than trying to determine if the website is a trusted site in general (problematic because of the number of possible trusted sites on the Internet) or a phishing site in general (also problematic because of the sophistication of current phishing attacks). More particularly, the anti-phishing module 200 simplifies the task of detecting phishing to a comparison of identifying information of a website to a signature of the particular sensitive site the user is trying to access. This advantageously increases the effectiveness of the anti-phishing module 200 while minimizing false positives.

If the user confirms that he or she is trying to access a particular sensitive site, the sensitive state monitor 201 invokes the phishing site detector 202. The phishing site detector 202 then determines whether or not the website providing the web page is the particular sensitive site the user is trying to access (step 508). For example, the phishing site detector 202 may extract the identifying information of the website and compare it to the signature of the particular sensitive site. If the website is not the particular sensitive site that the user is trying to access, the phishing site detector 202 deems the website to be a phishing site (step 509 to step 511). That is, although the website is serving a web page that appears to be from the particular sensitive site the user thinks he is accessing, the website is actually not the particular sensitive site. At that point, the phishing site detector 202 may initiate predetermined precautionary measures, such as alerting the user using a highly visible message box, for example.

Otherwise, if the website's identifying information matches the signature of the particular sensitive site, the phishing site detector 202 deems the website to be legitimate (step 509 to step 510) and the anti-phishing module 200 takes no further action concerning the website.

While specific embodiments of the present invention have been provided, it is to be understood that these embodiments are for illustration purposes and not limiting. Many additional embodiments will be apparent to persons of ordinary skill in the art reading this disclosure.

What is claimed is:

1. A method of protecting a client computer from phishing attacks, the method to be performed in the client computer and comprising:

detecting a web page received in the client computer, the web page being received from an external web server computer and being displayed in a web browser in the client computer;

determining whether the web page is a sensitive web page that accepts user confidential information for accessing an online financial account; and when the web page is deemed sensitive, prompting a user employing the client computer to confirm that the web page is indeed sensitive by asking the user to select a particular website from a list of predetermined websites that the user wants to access by using the web page, wherein the user is prompted by displaying a message to the user, the message including an option to select the particular website from the list of predetermined websites and an option to indicate that the user is not going to a sensitive website; and after the web page is deemed sensitive and after the user selects the particular website from the list of predetermined websites, determining whether the web page is from the particular website selected by the user from the list of predetermined websites.

2. The method of claim 1 wherein determining whether the web page is from the particular website selected by the user includes comparing a signature of the particular website with identifying information of the web server computer serving the web page.

3. The method of claim 2 wherein the signature of the particular website is stored as a pattern in the client computer.

4. The method of claim 3 wherein the pattern is periodically updated by receiving in the client computer new patterns from an external support server computer.

5. A client computer having memory and a processor configured to execute computer-readable program code in the memory, the memory comprising:

a sensitive state monitor configured to filter sensitive web pages from non-sensitive web pages, the sensitive web pages being those configured to receive confidential information for accessing an online account from a user of the client computer, the sensitive state monitor being configured to determine whether a web page is sensitive without having to determine if the web page is part of a phishing attack, the web page being received from a website and displayed in a web browser in the client computer, wherein the sensitive state monitor is configured to prompt the user to select a particular site from a list of predetermined sensitive sites when the web page is deemed a sensitive web page, wherein the user is prompted by displaying a message that includes an option to select the particular site from the list of predetermined sites and an option to indicate that the user is not going to a sensitive site, the particular site selected by the user being a particular website the user is trying to access to perform an online financial transaction using the web page, wherein the sensitive state monitor is configured to ask the user to confirm that the web page is indeed a sensitive web page and the user selects the particular site from a pull-down menu; and a phishing site detector configured to detect whether the website is a phishing site after the sensitive state monitor determines that the web page is a sensitive web page.

6. The client computer of claim 5 further comprising a plurality of patterns that include signatures of the predetermined sensitive sites.

7. The client computer of claim 6 wherein the patterns are periodically updated by a remote support server computer.

* * * * *